United States Patent [19]

Nachtergaele et al.

[11] Patent Number: 5,032,337
[45] Date of Patent: Jul. 16, 1991

[54] PROCEDURE FOR THE MANUFACTURE OF A MIXTURE OF STARCH AND POLYVINYL ALCOHOL AND THUS MANUFACTURED MIXTURE

[75] Inventors: Willy A. M. Nachtergaele, Zulte; Jan H. Van Nuffel, Ghent, both of Belgium

[73] Assignee: Amylum, naamloze vennootschap, Brussels, Belgium

[21] Appl. No.: 447,847

[22] Filed: Dec. 8, 1989

[30] Foreign Application Priority Data

Dec. 9, 1988 [BE] Belgium .............................. 08801391

[51] Int. Cl.$^5$ ................................................. B29B 9/12
[52] U.S. Cl. ................................. 264/141; 264/211.11; 264/211.23; 264/330; 425/204; 524/47
[58] Field of Search ................... 264/185, 186, 211.11, 264/211.23, 118, 141, 330; 524/47; 425/204

[56] References Cited

U.S. PATENT DOCUMENTS

| 2,239,718 | 4/1941 | Izard | 264/185 |
|---|---|---|---|
| 2,251,296 | 8/1941 | Shipp | 264/185 |
| 3,256,115 | 6/1966 | Stearns et al. | 264/141 |
| 3,316,190 | 4/1967 | Suzumura | 260/17.4 |
| 3,497,487 | 2/1970 | Bristol | 260/91.3 |
| 3,767,604 | 10/1973 | Hjermstad et al. | 524/47 |
| 4,206,101 | 6/1980 | Wysong | 264/185 |
| 4,425,452 | 1/1984 | Nakata et al. | 524/47 |
| 4,871,410 | 10/1989 | Bonnebat et al. | 264/185 |

FOREIGN PATENT DOCUMENTS

| 653335 | 1/1965 | Belgium . | |
|---|---|---|---|
| 0032802 | 7/1981 | European Pat. Off. . | |
| 0177428 | 4/1986 | European Pat. Off. | 264/141 |
| 881073 | 11/1961 | United Kingdom . | |
| 1162938 | 9/1969 | United Kingdom . | |

OTHER PUBLICATIONS

Westhoff, et al., "Starch-Polyvinyl Alcohol Films-Effect of Various Plasticizers", 402 Starch/Stärke, vol. 31, No. 5, 5/79.

Primary Examiner—Jeffery Thurlow
Attorney, Agent, or Firm—Foley & Lardner

[57] ABSTRACT 50 to 95 parts by weight starch and 5 to 50 parts by weight polyvinyl alcohol with a degree of saponification between 87 and 100% are thoroughly mixed and furthermore the moisture content of the mixture is regulated between 10 and 25 weight %. Subsequently the mixture obtained is subjected to a thermo-mechanical treatment at a temperature situated between 110° and 180° C. During the extrusion the mixture is subjected to shearing forces so that the product obtained when it is dispersed in cold water and subsequently is centrifuged, divides into a watery phase and a coacervate phase without a sediment of undissolved polyvinyl alcohol being formed.

9 Claims, No Drawings

PROCEDURE FOR THE MANUFACTURE OF A MIXTURE OF STARCH AND POLYVINYL ALCOHOL AND THUS MANUFACTURED MIXTURE

BACKGROUND OF THE INVENTION

The invention relates to a process for the manufacture of a mixture of starch and polyvinyl alcohol.

It is known that polyvinyl alcohol in different applications such as adhesives, sizing agent for threads, water dissolvable films and paper coating, exercises a positive influence on the functional properties of the prepared products.

The polyvinyl alcohol employed can moreover vary in properties depending on the application. These properties are determined by the degree of hydrolysis and the molecular weight of the product.

In most cases the polyvinyl alcohol needs to be heated sufficiently long in order to bring the product completely into solution.

Furthermore it frequently occurs that polyvinyl alcohol is employed in combination with starch derivatives which are soluble or dispersible in cold water.

This is particularly the case in paper coating compositions in which in practice mixtures of starch and polyvinyl alcohol are applied.

Such mixtures exert, in the presence of optical whiteners, an advantageous influence on the whiteness of the paper. Moreover the starch as a solution or otherwise is added to the size of whiteners. However a polyvinyl dispersion must first be manufactured which is then heated in order to dissolve the polyvinyl alcohol.

The starch can also be added directly in dry form to the size of optical whiteners. In the paper coating sector for that matter it is the trend to change over to superior dry material coatings.

The addition of a modified starch in dry form to a pigment size, with the intention of raising the dry material content of the coating composition, was already described in U.S. Pat. No. 4,425,452. This method offers the advantage that during the drying of the coated paper less moisture needs to be evaporated, which results in a more economical procedure. According to this patent, however no use is made of polyvinyl alcohol.

In the above-mentioned application but also in many other applications it would thus be very advantageous if the polyvinyl alcohol were very quickly soluble in cold water whereby the polyvinyl alcohol could also be added directly in dry form to the pigment slurry. On the one hand the coating installation would be simplified because no solution and heating installation for the starch and the polyvinyl alcohol are necessary. On the other hand, a coating agent with a higher dry material content would be obtained through which during the drying of the coated paper less energy needs to be employed in order to evaporate the superfluous moisture and/or through which the speed of the coater can be increased.

A cold soluble polyvinyl alcohol, whether or not in combination with a starch or a derivative thereof, however was unknown prior to the present invention.

SUMMARY OF THE INVENTION

The purpose of the present invention is to provide a procedure for the manufacture of a mixture of starch and polyvinyl alcohol whereby a mixture is obtained that is soluble in cold water.

DETAILED DESCRIPTION OF PREFERRED EMBODIMENTS

For this purpose 50 to 95 parts by weight starch and 5 to 50 parts by weight polyvinyl alcohol are thoroughly mixed, furthermore the moisture content of the mixture is regulated between 10 and 25 weight % and subsequently the mixture is subjected to a thermo-mechanical treatment at a temperature situated between 110° and 180° C., with which treatment this mixture is subjected to shearing forces such that the product obtained, when it is dispersed in cold water and subsequently centrifuged, divides into a watery phase and a coacervate phase without a third phase consisting of a sediment of undissolved polyvinyl alcohol being formed.

In a particular embodiment of the procedure a continuous extrusion is performed as the thermo-mechanical treatment.

In a notable embodiment of the invention the moisture content is regulated between 12 and 20 weight % during the mixing of the starch and the polyvinyl alcohol.

In a functional embodiment of the invention a polyvinyl alcohol with a degree of saponification between 87 and 100% is employed.

In paper coating strongly saponified polyvinyl alcohol is preferably applied.

The starch employed can be a natural or modified starch. The modified starch can be etherified or esterified and/or oxidatively broken down by acid or enzymes.

A granular etherified starch is preferably employed.

In another embodiment of the invention an acid is added to the mixture in order further to break down the starch.

The invention also relates to a mixture of starch and polyvinyl alcohol obtained according to the procedure according to one of the aforementioned embodiments.

Other details and advantages on the invention will appear from the following description of a procedure for the manufacture of a mixture of starch and polyvinyl alcohol and of a thus manufactured mixture, according to the invention; this description is only given as an example and does not restrict the invention.

For the manufacture of a mixture of starch and polyvinyl alcohol according to the invention, 50 to 95 and preferably 85 to 90 parts by weight starch and 5 to 50 and preferably 10 to 15 parts by weight polyvinyl alcohol are thoroughly mixed.

The polyvinyl alcohol has preferably a minimum degree of saponification of 87%. This degree of saponification can go to 100% and particularly for use in paper coating strongly saponified polyvinyl alcohol is preferably employed.

The starch can be natural or modified.

The modified starch can be etherified or esterified and/or be oxidatively broken down by acid or enzymes. A granular etherified starch is preferably employed.

The moisture content of the mixture is regulated between 10 and 20 weight %, preferably between 12 and 20 weight % and best between 14 and 18 weight %.

The mixture obtained is subjected to a thermo-mechanical treatment at a temperature situated between 110° and 180° C.

During this treatment the mixture is subjected to a shearing force so that the product obtained, when it is dispersed in cold water and subsequently centrifuged, divides into a watery phase and a coacervate phase without a third phase consisting of a sediment of undissolved polyvinyl alcohol being formed.

This sediment phase would be formed in the absence of, or with insufficient, thermo-mechanical treatment.

A suitable thermo-mechanical treatment is a continuous extrusion.

This extrusion can be performed in an extrusion apparatus that contains a cylinder with one or more rotating screws which give a buildup of pressure in the mixture, whereby the mixture present melts through the internal heat which is released and/or through externally supplied heat.

The melted mixture is then transported by means of the screw or the screws through the pressure cylinder toward the extremity of the extrusion apparatus, whereby the mixture is subjected to the shearing forces. At the extremity of the pressure chamber there are one or more openings through which the mixture is pressed outward.

A suitable extrusion apparatus is for example an apparatus found on the market of the type BUSS-PR 46. Such an extruder has a capacity of 18 kg of product per hour and has a length diameter ratio of 7. The extruder contains two screws with a diameter of 46 mm, namely a dosing screw which rotates at 13 revolutions per minute and an extrusion screw which rotates at 97 revolutions per minute. The time the mixture stays there amounts to 10 to 20 seconds at a temperature of between 130° and 150° C. and a pressure of between 5 and 10 kg per cm$^2$.

Other extruders, for example of the type CREUSOT-LOIRE can likewise be employed subject to the adjustment of the reaction conditions to the characteristics of the apparatus in order to obtain the desired shearing forces.

To a mixture an acid can possibly be added in order further to break down the starch. The added amount of acid is preferably selected so that the pH of a 10% suspension of the mixture is situated between 2 and 2.5.

Surprisingly, it has been determined that with use of the extruded mixtures the polyvinyl alcohol present dissolves very well and very quickly in cold water too.

In this way there is a clear difference to be observed in the dissolving speed between polyvinyl alcohol with a low degree of saponification, which is also considered as soluble in cold water, and extruded mixtures of starch and such a polyvinyl alcohol. The difference in dissolving speed is still much more clearly to be observed when strongly or completely saponified or hydrolized polyvinyl alcohol is compared with an extruded polyvinyl alcohol on the basis of starch and such a polyvinyl alcohol.

The extruded mixtures obtained are extremely useful as a binder in coating compositions for the coating of paper. These mixtures can be added in dry form to the pigment slurry, whereby the moisture content of the mixture decreases, which of course is advantageous.

The dry material content of the thus prepared coating composition can moreover be increased by 2 to 4 weight %, which results in a decrease of 7 to 14 weight % of the moisture that needs to be evaporated afterward.

Furthermore, it was determined, surprisingly that the application of the extruded mixtures according to the invention as binder in coating compositions gave a significantly greater whiteness to the treated paper than the corresponding non-extruded mixtures. These non-extruded mixtures have to be boiled beforehand. It is clear that there is question here of a synergistic effect.

Also films on the basis of extruded mixtures of starch and polyvinyl alcohol show interesting properties, such as a greater tensile strength and breaking length.

The invention will be further explained hereafter with the help of some examples.

Examples 1 through 5

25 kg of etherified starch, brought onto the market by the applicant under the name of AMYLUM A2, are placed in a mixer and stirred for 5 minutes.

After that the moisture content and pH are determined.

To the starch that has a moisture content of 13.2%, an amount of completely hydrolized (98%) polyvinyl alcohol with low viscosity, obtainable on the market under the name of AIRVOL 107® of Air Products in the ratio according to the following Table 1.

The whole is further homogenized and is subsequently mixed with the necessary amount of demineralized water in order to obtain the desired moisture content according to Table 1.

Finally the homogenized mixture is measured into doses by means of a dosing screw in an extrusion apparatus of the type CREUSOT-LOIRE EXTRUDER. The mixture is extruded under the extrusion conditions according to the following Table 1. In Table 1, H.S. indicates a screw with kneading elements and L.S. a standard screw.

After extrusion the mixture obtained is finely ground.

TABLE 1

| Example | 1 | 2 | 3 | 4 | 5 |
|---|---|---|---|---|---|
| Composition mixture | | | | | |
| starch | 90 | 90 | 50 | 50 | 90 |
| PVA | 10 | 10 | 50 | 50 | 10 |
| moisture | 20 | 12 | 20 | 12 | 20 |
| extrusion conditions | | | | | |
| T °C. | 110 | 180 | 110 | 180 | 110 |
| rotation speed screw (rpm) | 100 | 150 | 150 | 100 | 100 |
| configuration | H.S. | L.S. | H.S. | L.S. | L.S. |

Examples 6 through 8

The procedure according to Examples 1 through 5 is repeated but with the composition of the mixtures and the extrusion conditions as in the following Table 2, wherein, together with the dimineralized water for the adjustment of the moisture content, also 4 weight % concentrated sulfuric acid, calculated on the amount of starch, is added.

After the extrusion sodium bicarbonate is added to the extruded mixture in order to neutralize the acid present.

Example 8 is only taken for comparison since there is no PVA present and therefore falls outside the scope of the invention.

TABLE 2

| Example | 6 | 7 | 8 |
|---|---|---|---|
| Composition | | | |

TABLE 2-continued

| Example | 6 | 7 | 8 |
|---|---|---|---|
| mixture | | | |
| starch | 90 | 90 | 100 |
| PVA | 10 | 10 | — |
| moisture | 12 | 15 | 15 |
| extrusion conditions | | | |
| T °C. | 110 | 130 | 130 |
| rotation speed screw (rpm) | 150 | 100 | 100 |
| screw configuration | H.S. | L.S. | L.S. |

(H.S. is a screw with kneading elements and L.S. a standard screw).

Examples 9 and 10

The procedure according to Examples 6 through 8 is repeated but with the composition of the mixtures and the extrusion conditions as in the following Table 3 and furthermore with another type of polyvinyl alcohol, namely an only partially hydrolized (88-90%) polyvinyl alcohol with low viscosity that is obtainable on the market under the name of AIRVOL 203 ® of Air Products.

TABLE 3

| Example | 9 | 10 |
|---|---|---|
| Composition mixture | | |
| starch | 50 | 90 |
| PVA | 50 | 10 |
| moisture | 16 | 16 |
| extrusion conditions | | |
| T °C. | 130 | 130 |
| rotation speed screw (rpm) | 100 | 100 |
| screw configuration | L.S. | L.S. (standard screw) |

Results

The extruded mixtures obtained according to the examples described above were dispersed in cold water, in a concentration of 5 weight % and stirred for 3 minutes. The dispersed mixtures were subsequently centrifuged for 10 minutes at 3000 revolution per minute.

For comparison the following mixtures which were not prepared according to the invention and thus were not extruded, were likewise dispersed and centrifuged:

Example 11

90 parts by weight starch AMYLUM A2 prepared according to the procedure from Example 8 with a moisture content of 15% and 10 parts by weight polyvinyl alcohol AIRVOL 107 ®.

Example 12

50 parts by weight starch AMYLUM A2 prepared according to the procedure from Example 8 with a moisture content of 15% and 50 parts by weight polyvinyl alcohol AIRVOL 107 ®.

Example 13

90 parts by weight starch AMYLUM A2 prepared according to the procedure from Example 8 with a moisture content of 15% and 10 parts by weight polyvinyl alcohol AIRVOL 203 ®.

In Table 4 shown hereafter the viscosities of the dispersions and the centrifuge results are shown.

The distribution of the various phases are shown in percentages.

TABLE 4

| Example | Viscosity in mP | Aqueous Phase % | Gel Phase % | Sediment % |
|---|---|---|---|---|
| 1 | 96 | 52 | 48 | — |
| 2 | 92 | 59 | 41 | — |
| 3 | 38 | 79 | 21 | — |
| 4 | 42 | 88 | 12 | — |
| 5 | 82 | 50 | 50 | — |
| 6 | 30 | 95 | 5 | — |
| 7 | 20 | 99 | 1 | — |
| 8 | 20 | 99 | 1 | — |
| 9 | 32 | 98 | 2 | — |
| 10 | 26 | 99 | 1 | — |
| 11 | 20 | 97 | 1 | 2 |
| 12 | 20 | 92 | 1 | 7 |
| 13 | 23 | 98 | 1 | 1 |

An additional test was performed on the layer of viscous mixtures in order to verify to what extent the polyvinyl alcohol present was dissolved.

During this the sample material was dispersed in cold water under violent stirring. The concentration of the dispersions amounted to 28% dry material. The dispersions obtained were then filtered through a 53 micron sieve. The residue on the sieve was then dried and weighed. The residue was expressed as a percentage of the amount of dry material used. The residual polyvinyl alcohol content was then determined from the difference with a reference sample, which contained no polyvinyl alcohol. The results are shown in the following Table 5.

TABLE 5

| | residue | residual polyvinyl alcohol |
|---|---|---|
| 6 | 0.7% | 2.7% |
| 7 | 0.8% | 3.9% |
| 10 | 0.56% | 1.3% |
| 11 | 8.45% | 80.2% |
| 13 | 1.35% | 9.0% |
| reference | 0.43% | — |

The residual polyvinyl alcohol was expressed as a percentage of the polyvinyl alcohol present, which is not dissolved.

From Table 5 it clearly appears that the polyvinyl alcohol present with the examples according to the invention is practically completely dissolved. In the case that partially hydrolized polyvinyl alcohol was employed it appears that here also the solubility is greatly improved.

Applications

"Coating" compositions were produced by means of products according to the invention and compared with known compositions.

Moreover the dry material and the viscosity of the "coating" mixture, as well as the dry material after dilution of the pigment size were determined at 1000 mP. After treatment of the paper with this composition the whiteness was measured with the assistance of a Hunterlab apparatus.

The products of the invention were added to the "coating-premix" in dry form. In the other cases the binder or co-binder had to be dissolved beforehand with exception of the extruded starch from Example 8.

In the following examples the following precoating composition was employed:

| | | | | | |
|---|---|---|---|---|---|
| pigment: | 80 | parts calcium carbonate (Hydrocarb 90) ® | | | |
| | 20 | parts China clay (Amazon 88) ® | | | |
| binder: | 8 | parts styrene butadiene latex (DL 685) ® | | | |
| additive: | 1 | part Urecoll ® | | | |
| | 1 | part calcium stearate | | | |
| | 1.5 | parts optical whitener (Blancophor P) | | | |

This size has a dry material content of 72.0%.

The added materials and the results obtained are shown in the following Table 6:

TABLE 6

| composition | binder | parts | % d.m. (1) | viscosity | % d.m. (2) | whiteness |
|---|---|---|---|---|---|---|
| I | latex | 2 | 69.0 | 2450 | 65.0 | 90.9 |
| | CMC | 1 | | | | |
| II | latex | 2 | 67.4 | 920 | 67.4 | 90.8 |
| | AIRVOL 107 ® | 1 | | | | |
| III | from ex. 8 | 4 | 72.5 | 3000 | 66.3 | 89.7 |
| IV | from ex. 7 | 4 | 72.5 | 1840 | 69.3 | 92.2 |
| V | from ex. 10 | 4 | 72.5 | 2560 | 68.2 | 91.4 |
| VI | from ex. 11 | 4 | 70.5 | 2500 | 66.7 | 90.8 |
| VII | from ex. 13 | 4 | 70.5 | 2200 | 67.0 | 90.9 |

(1) before dilution.
(2) after dilution to 1000 mP.

From the above table it therefore clearly appears that in the case of the compositions IV and V "coating" mixtures are obtained with a distinctly higher dry material, when compared with the compositions I and II.

In addition to this the greater whiteness for paper "coated" with this composition is striking; a gain of 0.5 to 1% in whiteness is considered as a great advantage in the paper industry.

Another application exists in manufacturing water soluble films.

A water soluble film manufactured on the basis of the mixture of starch and polyvinyl alcohol manufactured according to the above-mentioned Example 2 was compared with a pure polyvinyl alcohol film (polyvinyl alcohol AIRVOL 203 ® and with a film on the basis of a mixture with the same composition as in Example 2 but without the extrusion according to the invention.

The mixture of the pure polyvinyl alcohol was boiled beforehand. The composition according to Example 2 was stirred up in cold water and used as such.

The concentration of the solution amounted to 10%.

The spread out solutions were left to dry in the air.

The tensile strength, the breaking length and the elongation capacity of the films obtained is shown in the following Table 7.

TABLE 7

| | film thickness (mm) | weight (g/m$^2$) | tensile strength (daN) | breaking length (km) | elongation (mm) |
|---|---|---|---|---|---|
| (1) | 0.063 | 74.18 | 2.23 | 2.00 | 21.7 |
| ex. 2 | 0.056 | 78.25 | 3.21 | 2.80 | 1.5 |
| mixture | 0.062 | 86.25 | 2.04 | 1.60 | 1.7 |

(1) AIRVOL 203 ®

The invention is in no way restricted to the embodiments described above and within the scope of the patent application many changes can be applied to the described embodiments, among others regarding the choice of the raw materials and the apparatus employed.

We claim:

1. A process for manufacturing a mixture of starch and polyvinyl alcohol comprising the steps of:
   (A) mixing thoroughly from about 50 parts by weight starch and about 50 parts by weight polyvinyl alcohol up to about 95 parts by weight starch and about 5 parts by weight polyvinyl alcohol while adjusting and maintaining the moisture content of the resultant solid mixture between about 10 and 25 weight percent; subsequently
   (B) subjecting the resultant solid mixture obtained in step (A) to a thermomechanical treatment comprising applying shearing forces to the mixture at a temperature between about 110° and 180°, and finally
   (C) grinding the resultant treated mixture,
   wherein sufficient shearing forces are applied in step (B) so that the resultant ground product from step (C), when it is dispersed in cold water and subsequently centrifuged, forms and aqueous phase and a coacervate phase but is substantially free of a third phase consisting of a sediment of undissolved polyvinyl alcohol.

2. The process according to claim 1, wherein said thermo-mechanical treatment comprises a continuous extrusion.

3. The process according to claim 1, wherein said moisture content is maintained between 12 and 20 weight % during step (A).

4. The process according to claim 3, wherein said moisture content is maintained between 14 and 18 weight % during step A.

5. The process according to claim 1, wherein said polyvinyl alcohol has a degree of saponification between 87 and 100%.

6. The process according to claim 1, wherein in step (A), 85 to 90 parts by weight starch and 10 to 15 parts by weight polyvinyl alcohol are mixed.

7. The process according to claim 1, wherein the starch is a granular etherified starch.

8. The process according to claim 1, wherein step (A) further comprises adding an acid to the mixture in order to further break down the starch.

9. The process according to claim 8, wherein the amount of said added acid is such that a 10% suspension of the acidified mixture in water has a pH between about 2 and 2.5.

* * * * *